350-96.1 SR
XR 3,229,106
A
SEARCH ROOM

METHOD OF MODULATING LIGHT WITH INTRINSIC SEMICONDUCTOR DEVICE AND ELECTRICAL SIGNAL MODULATOR EMPLOYING SUCH DEVICE
Filed Oct. 16, 1961

SUBSTITUTE FOR MISSING XR

INVENTORS.
JEAN F. DeLORD
WILLIAM C. MYERS
KENT H. JOHNSTON
BY
BUCKHORN, CHEATHAM & BLORE
ATTORNEYS 3,229,106

METHOD OF MODULATING LIGHT WITH INTRINSIC SEMICONDUCTOR DEVICE AND ELECTRICAL SIGNAL MODULATOR EMPLOYING SUCH DEVICE

Jean F. De Lord, Portland, William C. Myers, Hillsboro, and Kent H. Johnston, Beaverton, Oreg., assignors to Tektronix, Inc., Beaverton, Oreg., a corporation of Oregon Filed Oct. 16, 1961, Ser. No. 145,375
8 Claims. (Cl. 250—217)

Figure 3:
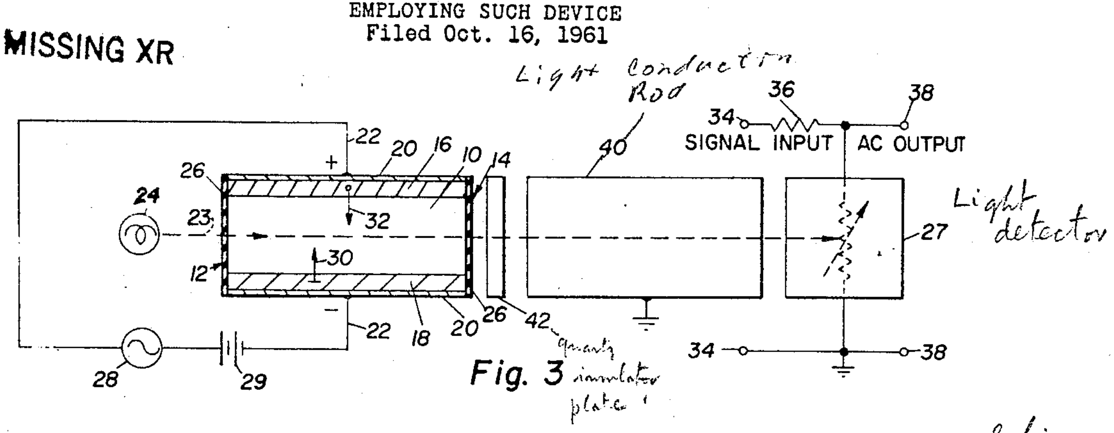

The present invention relates generally to optical devices and in particular to light modulators and filters made of semiconductor material as well as to electrical signal chopper apparatus using such light modulator.

Conventional apparatus used to modulate light usually consists of a rotating metal disc having alternate sections which totally absorb or totally transmit the light being modulated. These mechanical "light choppers" have many inherent disadvantages including the fact that they wear out quickly due to the use of rotating mechanical parts. In addition, the maximum frequency of modulation is as a practical matter limited to approximately 1,000 cycles per second in these light choppers and they also produce a high noise voltage in the electrical light detector. In order to overcome these disadvantages it has been previously proposed to use a semiconductor material having a PN junction therein as the light modulator. The light transmission characteristic of the semiconductor material varies as the concentration of current carriers therein changes due to applying a bias voltage across the PN junction. However, the light modulation efficiency of these PN junction light modulators is low. This low efficiency is apparent due to the fact that a great many light absorbing current carriers always exist in the light modulator regardless of its bias voltage in the regions on either side of the PN junction so that the modulator is never substantially light transparent in such regions.

The above discussed disadvantages of previous light modulators have been overcome by the semiconductor light modulator of the present invention. This light modulator avoids the disadvantages inherent in mechanical light choppers since it is a semiconductor device which does not have any moving mechanical parts. It has an extremely long lifetime and a low noise level, while its maximum frequency response of 6 to 10 kilocycles per second is considerably above that of available high sensitivity photoconductor light detectors. Also, unlike previous semiconductor light modulators the modulator of the invention has a high modulation efficiency because it employs as a light path semiconductor material with both PI and NI junctions therein in order to provide two current carrier injecting junctions enabling the "double injection" of free electrons and holes into the light absorbing region of the modulator to give a greater density of free carriers in such region.

Broadly, the optical device of the present invention includes a body of intrinsic semiconductor material whose optical properties may be varied by varying the number of current carriers therein. More specifically, the light modulator of the invention is formed of a single piece of "intrinsic" semiconductor material which is defined as one substantially free of electrical current carriers except those thermally generated, including both essentially pure semiconductor material having practically no doping impurities therein and compensated impure semiconductor material having substantially equal amounts of P-type and N-type impurities therein. This piece of intrinsic semiconductor material may be provided, for example, with layers of P-type and N-type semiconductor material, respectively, on two opposite surfaces thereof so that a region of intrinsic semiconductor material exists between such layers and forms a PI junction and an NI junction with said layers. When these PI and NI junctions are highly forward biased by a half cycle of voltage from a suitable source of A.C. voltage, double injection of electron and hole current carriers from the N-type and P-type layers, respectively, into the intrinsic semiconductor region occurs during that half cycle and causes light absorption according to the concentration of current carriers therein. Few current carriers are injected into the intrinsic region during the other half cycle because the PI and NI junctions are no longer highly forward biased. Thus, it is apparent that the relatively wide region of intrinsic semiconductor material may be made essentially opaque or transparent to certain wavelengths of light so that efficient light modulation may be obtained thereby.

Obviously the semiconductor device of the invention may also be used as light filter merely by connecting it to a source of variable D.C. forward bias voltage since it absorbs more light of some frequencies than of others when forward bias is applied. In order to vary the light transmission characteristic of the filter, it is only necessary to vary the amplitude of the D.C. bias voltage.

The semiconductor light modulator of the present invention is particularly useful in an electrical signal chopper apparatus which converts D.C. signals varying at low frequency or low frequency A.C. signals superimposed on a D.C. voltage to higher frequency A.C. voltages which can be more easily amplified. This signal chopper apparatus includes a light source, and a photoconductive light detector in addition to the above described light modulator. If the signal to be converted is supplied as an input voltage across the photoconductor detector, the light modulator of the present invention may be used to vary the impedance of the photoconductor at a frequency determined by the frequency of the A.C. bias voltage on the light modulator so that the output voltage obtained across the photoconductor is an A.C. voltage which is amplitude modulated by the input signal voltage. This A.C. output voltage may be amplified and then demodulated to produce an amplified signal of the same form as the input voltage without the disadvantage of having to use a D.C. amplifier with its inherent D.C. drift problems.

Therefore, one object of the present invention is to provide an improved optical element made of semiconductor material having variable light transmission and absorption properties and a method of operating the element to vary the amount of light transmitted through such element.

Another object of the present invention is to provide a light modulator of semiconductor material in which a current carrier impurity doped portion forming a junction with an intrinsic portion is employed in conjunction with a varying bias voltage across such junction to vary the concentration of current carriers injected into the intrinsic portion from such impurity portion.

A further object of the present invention is to provide an improved light modulator of semiconductor material and method of operation in which a body of intrinsic semiconductor material having P-type semiconductor material on one surface thereof and N-type semiconductor material on the other surface thereof is employed to provide a PI junction and an NI junction with a portion of intrinsic semiconductor material therebetween so that current carriers of opposite type may be injected into such portion simultaneously by applying a forward biased voltage to such junctions to reduce the light transmission of the intrinsic portion.

Another object is to provide a light filter of intrinsic semiconductor material whose light transmission characteristic may be changed by varying the concentration of current carriers therein.

Still another object of the invention is to provide an electrical signal chopper in which slowly varying D.C. signals or low frequency A.C. signals are converted to higher frequency A.C. voltages by employing a variable impedance in the form of a photoconductor detector in conjunction with a light source and a light modulator of semiconductor material having a PI junction and an NI junction across which a varying bias voltage is impressed.

Figure 1:
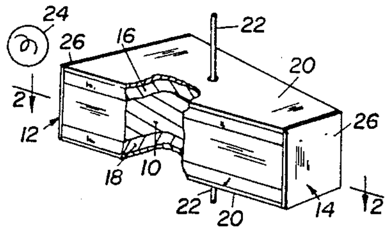
Figure 2:
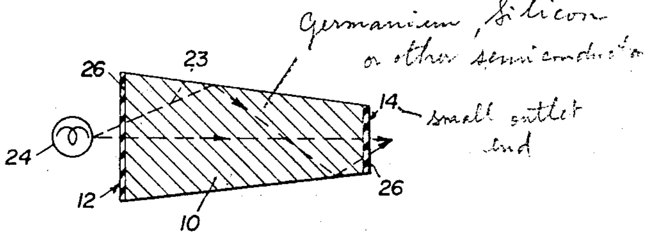
Figure 4:
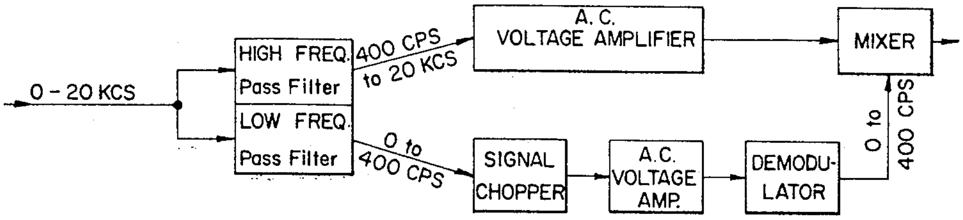

Additional objects and advantages of the present invention will be apparent after referring to the following detailed description of the preferred embodiment of the invention and to the attached drawings of which:

FIG. 1 is a perspective view of one embodiment of an optical device in accordance with the present invention; with portions broken away to show internal structure, FIG. 2 is a horizontal section taken along line 2—2 of FIG. 1, FIG. 3 is a schematic view of an electrical signal chopper apparatus in accordance with the present invention using the optical device of FIG. 1 as a light modulator, and FIG. 4 is a block diagram of an electrical circuit including the electrical signal chopper of FIG. 3.

The optical device of the present invention may be used as a light modulator or as a light filter having a variable light transmission characteristic depending upon the type of bias voltage applied thereto. As shown in FIG. 1 one embodiment of this optical device may include a body 10 of intrinsic semiconductor material which is normally substantially free of current carriers except those thermally generated therein. This intrinsic semiconductor material may be either pure semiconductor material having substantially no current carrier impurities therein or it may consist of compensated semiconductor material having equal amounts of P-type and N-type impurities therein. However, the pure semiconductor material appears to be more efficient light modulating material than compensated semiconductor material. Germanium, silicon and other semiconductor materials which are transparent to certain wavelengths of light, may be used for the body 10 which may be formed in a tapered shape from inlet end 12 to a smaller outlet end 14 to concentrate the transmitted light into a smaller area and thereby increase its intensity. For example, the semiconductor body 10 may be 0.05 inch high, 0.5 inch long, and have a width tapering from 0.18 to 0.08 inch. This semiconductor body 10 may have two substantially parallel layers 16 and 18 of impurity doped semiconductor material on opposite surfaces thereof, layer 16 being of the P-type semiconductor material and the layer 18 being of N-type semiconductor material. Such layers form PI and NI junctions respectively with the intrinsic semiconductor material of body 10. When the body 10 is of germanium, these junctions may, for example, be formed of indium-gallium acceptor alloy and gold-antimony donor alloy having alloy compositions of 99% to 1%, by conventional alloy junction methods to produce abrupt or narrow thickness junctions with the intrinsic semiconductor material. A further layer 20 of metal conducting material may be provided over each layer of P-type and N-type semiconductor material so that the metal layer 20 forms a large area ohmic contact for such semiconductor layers. An electrical lead 22 is attached to each of the conductive layers 20 by conventional soldering techniques in order to provide electrical connections to a suitable source of bias voltage.

When a semiconductor material having a high index of refraction, such as germanium, is used as the semiconductor material of the body 10, the light 23 emitted by light source 24 is reflected from the side walls of the semiconductor material as shown in FIG. 2 so that it passes out of the semiconductor body 10 only at outlet end 14. It should be noted that the taper of the modulator body 10 for collecting and transmitting the light to outlet end 14 must not be too great. Thus, the high index of refraction of germanium will not allow the inlet end 12 to be much wider than the outlet end 14 because if it is the light reflected from the sides of body 10 will be absorbed within body 10 before it escapes through the outlet end. When semiconductor materials are used which have a low index of refraction, it is sometimes necessary to provide the sides of the semiconductor body 10 with light reflecting coatings to enable efficient light transmission from the inlet end 12 to the outlet end 14 of such body. Also, anti-reflection coatings 26 of silicon monoxide may be provided on the inlet end 12 and the outlet end 14 of the semiconductor body 10 by conventional methods to increase light transmission efficiency and limit the range of wavelengths transmitted.

It is well known that pure germanium is an infrared light filter which will ordinarily only transmit light above 1.8 microns wavelength. However, the optical characteristics of the germanium semiconductor device of the present invention may be varied by varying the electrical field across such device so that a considerable portion of the light normally transmitted is absorbed. This may be accomplished by applying a bias voltage between the electrical leads 22 so as to control the biasing of the PI and NI junctions formed in such semiconductor body. When the voltage is such that the electrical lead attached to the P-type layer 16 is positive and the electrical lead attached to the N-type layer 18 is negative, both the PI junction and the NI junction will be forwardly biased so that electrons are injected into body 10 from layer 18 and holes are injected into the body 10 from layer 16. This double injection of current carriers into the semiconductor body 10 changes the light transmission characteristics of body 10 according to the concentration of current carriers therein so that a greater number of current carriers depending upon the amplitude of the bias voltage produces a more light opaque material. Conversely when the forward bias voltage is removed or polarity of the bias voltage is reversed, both the PI junction and the NI junction are no longer forward biased so that substantially no current carriers are injected into the intrinsic semiconductor body 10 and the density of free carriers drops to the normal thermally generated density so that the body 10 returns to its normally transparent condition.

In addition, it has been discovered that the light transmission characteristic of the semiconductor body 10 varies with temperature in a predictable manner. For instance, if the device is cooled from room temperature to −200° C., its light modulation of wavelengths immediately adjacent both sides of a substantially unaffected peak point at 3.5 microns is reduced from 90% to 2%. This also extends the threshold transmission wavelength from 1.8 to 1.5 microns.

Therefore, the optical device of FIG. 1 may be used as a variable light filter, if a variable D.C. voltage is used as the bias voltage or a controlled cooling means is employed to vary its temperature, whose light transmission intensity depends upon the cooling temperature or the magnitude of the D.C. voltage applied across the leads 22. It should also be apparent that the optical device of FIG. 1 may be used as a light modulator if a periodically varying bias voltage is used. In the embodiment described, the modulation varies from approximately 98% at 5 amps. peak current to approximately 55% at 1 amp. peak current through lead 22. Thus, if an A.C. voltage source is suitably connected across the electrical leads 22, the light transmission characteristic of the semiconductor device varies from substantially transparent to substantially opaque during the positive and negative half of the A.C. cycle for the reasons indicated above.

Obviously the optical device of the present invention may have many uses. However, it is particularly adaptable for use as an electrical signal chopper to convert a low frequency A.C. signal or a varying D.C. signal into an A.C. signal of an appropriate frequency for A.C. amplification as shown in FIG. 3. The direct amplification of essentially D.C. voltages of small magnitudes requires expensive and elaborate equipment to prevent D.C. signal drift. In order to overcome the problems of D.C. voltage amplifiers, a modulator in the form of a signal chopper may be employed to first convert the input signal to an A.C. signal which may be amplified by conventional A.C. voltage amplifiers and then demodulated to produce an amplified signal of the same form as the original input signal. Such signal chopper may be employed in a suitable electrical circuit such as that shown in the block diagram of FIG. 4 which is of a type particularly useful in a cathode ray oscilliscope to amplify the signal voltage applied to the vertical deflection plates thereof. As indicated in the block diagram, the input signal voltage may be a waveform containing frequencies of between 0 to 20 kilocycles per second. Part of this signal is transmitted to a high frequency pass filter which passes those frequencies above 400 cycles per second and another part of the input signal may be passed through a low frequency pass filter which transmits D.C. and all frequencies below 400 cycles per second. These low frequency signals below 400 cycles per second including D.C. voltages are then passed through the signal chopper which amplitude modulates the input signal upon an A.C. voltage of an appropriate frequency, for example 2 kc. The A.C. output voltage is then amplified by a conventional A.C. voltage amplifier and the amplified signal is transmitted to a demodulator which removes the two kc. signal from the amplified signal before transmitting the amplified input signal to a mixer which adds this amplified low frequency signal below 400 c.p.s. to the high frequency signal above 400 c.p.s. which has also been amplified in a conventional A.C. amplifier. The resultant amplified signal voltage is then supplied to the vertical deflection plates of the cathode ray oscilloscope for display and analysis.

A more detailed disclosure of the signal chopper of FIG. 4 is shown in the schematic diagram of FIG. 3. This electrical signal chopper or amplitude modulator may include a conventional light sensitive element 27 of photoconductor material, such as lead sulphide, whose resistance varies with the amount of light impinging upon such photoconductor material. The element 27 is positioned on the opposite side of a light modulator 10, such as that shown in FIG. 1, from that of the light source 24 so that light must be transmitted through such light modulator before it strikes the light sensitive element. Therefore, the resistance of the element 27 varies in accordance with the change in light transmission of the light modulator 10. The maximum electrical frequency response of this photoconductor element 27 limits the frequency of the signal chopper since it is considerably less than that of the light modulator 10. This light modulator may be connected through leads 22 to a source 28 of periodically varying bias voltage, such as 2 kilocycles per sec. A.C. voltage, in series with a source of D.C. forward bias voltage 29 having a value approximately equal to that maximum amplitude of ½ cycle of the A.C. bias voltage. Since the frequency of the source 28 of A.C. bias voltage determines the light transmission characteristics of the semiconductor body 10 in the manner described as to FIG. 1, it also determines the frequency of the varying resistance of element 27. During the positive ½ cycle of the A.C. bias voltage with the polarity shown in FIG. 3, both the PI junction and NI junction are highly forward biased so that electrons 30 are injected from the N-type layer 18 and holes 32 are injected from P-type layer 16 into the intrinsic semiconductor body 10. If a lower frequency A.C. or a D.C. voltage is applied to the input terminals 34 of the signal chopper across the variable resistance of element 27 and the resistor 36 in series with the signal chopper, an A.C. output voltage may be obtained across the output terminals 38 which is amplitude modulated by the signal voltage. The voltage impressed across the light sensitive element 27 should contain a D.C. component of sufficient magnitude that the signal voltage does not reverse the polarity of the voltage across such element.

In order to increase the efficiency of the light modulator a light pipe in the form of a light conducting rod 40 of germanium or other semiconductor material similar to that used in the light modulator body 10 may be inserted between the light modulator and the light detector 27. The light pipe 40 may be coated with a light reflecting material in order to improve its efficiency of light conduction. Also, the light pipe 40 may be electrically connected to ground and a quartz insulator plate 42 inserted between the light pipe 40 and the light modulator element 10 in order to prevent any electrical signal from feeding back to the detector 27 from the light modulator 10.

The preceding detailed description of the invention is merely illustrative of the many possible embodiments thereof which will be obvious to one having ordinary skill in the art. For example, the light modulator may include any number of semiconductor junctions therein with proper positioning of the leads furnishing the biasing voltages thereto, the shape of the light modulator body may be changed to any suitable configuration and the semiconductor material used for the intrinsic semiconductor body and the impurity doped layers thereon may be any suitable semiconductor material which forms narrow PI and NI junctions with the intrinsic material. Also, the optical device of the present invention may be used in other apparatus besides electrical signal choppers including infrared absorption spectrometers and any other optical apparatus utilizing filters or light modulators. Therefore, it is not intended to limit the scope of the present invention by the preceding detailed description of a preferred embodiment thereof and such scope should be determined only by the following claims.

We claim:

1. Apparatus for changing the frequency of an electrical signal comprising:
   a light source,
   a light modulator of semiconductor material having at least one portion containing current carrier impurities therein which forms a junction with a region of intrinsic semiconductor material normally substantially free of current carriers,
   a light sensitive element of photoconductor material positioned to receive the light emitted by said light source after it is transmitted through said modulator so that the impedance of said element varies with said transmitted light and the majority of the light received by said element passes through said intrinsic region,
   means to apply an input voltage of one frequency across said variable impedance of said element, and
   means for applying a bias signal voltage of another frequency across the junction in said modulator to forward bias said junction and alternately remove said forward bias in order to vary the light transmission characteristic of said modulator and to vary the impedance of said light sensitive element so as to produce an output voltage across said variable impedance related in frequency to said bias voltage.

2. An electrical signal modulator comprising:
   a light source,
   a light modulator of semiconductor material having a PI junction and an NI junction therein with a region of intrinsic semiconductor material between said junctions which is normally light transparent,
   a light detector of photoconductor material positioned to receive the light emitted by said light source after it is transmitted through said modulator so that the impedance of said detector varies with said transmitted light and the majority of the light received by said detector passes through said intrinsic region, means to apply an input signal across said variable impedance of said detector, and means for applying an A.C. bias voltage across each of said PI and NI junctions in said modulator to forward bias both of said junctions and alternately remove said forward bias in order to vary the light transmission characteristic of said modulator by the injection of current carriers into said region of intrinsic semiconductor material and to obtain an output signal from the variable impedance of said detector related in frequency to said A.C. bias voltage.

3. An electrical signal chopper modulator for converting an input signal D.C. or low frequency A.C. to an output signal of higher frequency A.C., comprising:

a light source, a light modulator of semiconductor material having a PI junction and an NI junction adjacent opposite surfaces thereof with a region of intrinsic semiconductor between said junctions, a light detector of photoconductor material positioned to receive the light emitted by said light source after it is transmitted through said modulator so that the resistance of said detector varies with said transmitted light and the majority of the light received by said detector passes through said intrinsic region, means to apply an input signal to said variable resistance of said detector, and means to apply an A.C. bias voltage of higher frequency than said input signal across each of said PI and NI junctions in said modulator so that both of said junctions are highly forward biased and alternately substantially unbiased in order to vary the light transmission characteristic of said modulator by varying the concentration of current carriers therein and to obtain an A.C. output signal from the variable impedance of said detector related in amplitude to said signal and in frequency to said A.C. bias voltage.

4. An electrical signal chopper apparatus for converting D.C. or low frequency A.C. voltage to higher frequency A.C. voltage comprising:

a light source, a light modulator of germanium semiconductor material having a PI junction and an NI junction therein with a region of intrinsic semiconductor material between said junctions which is normally light transparent, a light detector of photoconductor material positioned to receive the light emitted by said light source after it is transmitted through said modulator so that the resistance of said detector varies with said transmitted light and the majority of the light received by said detector passes through said intrinsic region, a light conducting rod of germanium similar to said region of said modulator, positioned between said detector and said modulator and electrically grounded, means to apply a D.C. or low frequency A.C. input voltage across said variable resistance of said detector, and means to apply a higher frequency A.C. bias voltage across each of said PI and NI junctions in said modulator so that both of said junctions are forward biased and alternately substantially unbiased in order to vary the light transmission characteristic of the intrinsic region of said modulator and to vary the resistance of said detector so as to produce a higher frequency A.C. output voltage from across said variable resistance.

5. A method of controlling the transmission of light, comprising:

directing light onto a semiconductor body having a region of intrinsic conductivity which is normally transparent to said light and a region containing current carrier impurities of one predominant type so that the majority of said light passes through the intrinsic region;

injecting free current carriers into the intrinsic region of said semiconductor body from the impurity region of said semiconductor body; and varying the rate of carrier injection to change the density of current carriers in said intrinsic region in order to vary the light transmission of said intrinsic region.

6. A method of modulating light, comprising:

positioning a semiconductor body having a region of intrinsic conductivity which is normally transparent to light between a region of N-type conductivity and a region of P-type conductivity, in the path of a beam of light so that the majority of said light passes through the intrinsic region;

injecting free current carriers into the intrinsic region of said semiconductor body from both the N-type region and the P-type region of said semiconductor body; and varying the density of the free current carriers in said intrinsic region to change the light transmission characteristic of said intrinsic region and to modulate the light transmitted through said semiconductor body.

7. A method of modulating light, comprising:

passing light through a semiconductor body having a region of intrinsic conductivity which is normally transparent to said light, said intrinsic region being positioned between a region of N-type conductivity and a region of P-type conductivity to form an NI-junction and a PI-junction so that the majority of said light is transmitted through said intrinsic region;

applying an electrical field across said semiconductor body to inject free current carriers into said intrinsic region from both said P-type region and said N-type region to reduce the light transmission of said intrinsic region;

varying said electrical field to change the rate of injection of current carriers into said intrinsic region in order to change the density of current carriers in said intrinsic region; and detecting the light transmitted through said intrinsic region.

8. A method of modulating infra-red light, comprising:

passing infra-red light through a semiconductor body having a region of intrinsic conductivity which is normally transparent to said light, between a region of N-type conductivity and a region of P-type conductivity so that the majority of said light is transmitted through the intrinsic region;

applying a forward bias D.C. voltage to the N-type region and the P-type region of said semiconductor body in order to inject free donor and acceptor current carriers into the intrinsic region of said semiconductor body to reduce the light transmission of said intrinsic region; and applying an A.C. signal voltage to said N-type region and said P-type region to vary the rate of injection of current carriers into said intrinsic region so that the density of current carriers in said intrinsic region varies to modulate said light in accordance with said signal voltage.

References Cited by the Examiner

UNITED STATES PATENTS

| | | | |
|---|---|---|---|
| 2,692,950 | 10/1954 | Wallace | 88—61 X |
| 2,776,367 | 1/1957 | Lehovec | 250—211 X |
| 2,928,056 | 3/1960 | Lambert | 330—37 X |
| 2,986,591 | 5/1961 | Swanson et al. | 317—235 X |

OTHER REFERENCES

Gibson: Germanium Modulator for Infrared Communication, Electronics, October 1954, pp. 155 to 157.

JEWELL H. PEDERSEN, *Primary Examiner.*